No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 1.

WITNESSES:
Ella L. Giles
Otto Munk

INVENTOR
Sebastian Ziani de Ferranti
BY
Richardson
ATTORNEYS

No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 2.

WITNESSES:
Ella L. Giles
Otto mmck

INVENTOR
Sebastian Ziani de Ferranti
BY
Richardson
ATTORNEYS

No. 684,926. Patented Oct. 22, 1901.
S. Z. DE FERRANTI.
VALVE OPERATING GEAR FOR ENGINES.
(Application filed July 31, 1900.)

(No Model.) 9 Sheets—Sheet 4.

WITNESSES:
Ella L. Giles
Otto munk

INVENTOR
Sebastian Ziani de Ferranti
BY
Richardson
ATTORNEYS

No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 5.

WITNESSES:
INVENTOR

No. 684,926. Patented Oct. 22, 1901.
S. Z. DE FERRANTI.
VALVE OPERATING GEAR FOR ENGINES.
(Application filed July 31, 1900.)

(No Model.) 9 Sheets—Sheet 6.

WITNESSES:
Ella L. Giles

INVENTOR
Sebastian Ziani de Ferranti
BY
Richards
ATTORNEYS

No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 7.

FIG. 13.

WITNESSES:
Ella L. Giles
Otto Munk

INVENTOR
Sebastian Ziani de Ferranti
BY
Richardson
ATTORNEYS

THE NORRIS PETERS CO., PHOTO-LITHO., WASHINGTON, D. C.

No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 8.

FIG. 14.

WITNESSES:
Ella L. Giles
Otto Munk

INVENTOR
Sebastian Ziani de Ferranti
BY
Richardson
ATTORNEYS

No. 684,926. Patented Oct. 22, 1901.
S. Z. DE FERRANTI.
VALVE OPERATING GEAR FOR ENGINES.
(Application filed July 31, 1900.)
(No Model.) 9 Sheets—Sheet 9.

FIG. 15.

WITNESSES:
Ella L. Giles
Otto Munk

INVENTOR
Sebastian Ziani de Ferranti
Richardson
ATTORNEYS

UNITED STATES PATENT OFFICE.

SEBASTIAN ZIANI DE FERRANTI, OF HOLLINGWOOD, ENGLAND.

VALVE-OPERATING GEAR FOR ENGINES.

SPECIFICATION forming part of Letters Patent No. 684,926, dated October 22, 1901.

Application filed July 31, 1900. Serial No. 25,428. (No model.)

*To all whom it may concern:*

Be it known that I, SEBASTIAN ZIANI DE FERRANTI, engineer, a subject of the Queen of Great Britain and Ireland, and a resident of Hollingwood, in the county of Lancaster, England, have invented certain new and useful Improvements in Valve Operating and Governing Gear for Steam-Engines, (for which I have made application for Letters Patent in Great Britain, No. 3,536, dated February 22, 1900,) of which the following is a specification.

My invention relates principally to high-speed steam-engines; and my object is to produce a high-speed engine having a very effective automatic cut-off valve and governing-gear.

In high-speed engines as hitherto constructed it has been found impossible to govern effectively by automatic cut-off, as the only effective automatic cut-off devices in use are those which depend upon trip-gear, and as an effective trip-gear requires sharply-defined edges in contact, trip-gear engines, such as the well-known Corliss-type engine, have not been run at high speeds. Accordingly, existing reciprocating high-speed engines are governed mainly by throttling the steam-supply.

My invention consists in certain novel devices and combinations, as will be hereinafter fully described and pointed out in the claims.

Referring now to the accompanying drawings, which illustrate one form of my invention as applied to a compound vertical steam-engine.

A is the low-pressure, and B the high-pressure, cylinder. Each cylinder has a steam-valve and an exhaust-valve at the top and a steam and an exhaust valve at the bottom. These valves are preferably grid-valves and cover nearly the whole of the top and bottom of the cylinders.

C C are the steam-valves, and D D the exhaust-valves.

E E are the pistons, and F F the piston-rods.

G is a vertical shaft driven by gearing from the crank-shaft and driving, by means of the bevel-wheels H and K, the horizontal shaft L. This shaft L carries a skew-wheel M, which drives the cam-shafts, as will be described hereinafter. The shaft L also drives the governor N by means of the bevel-wheels O and P.

Figure 3:
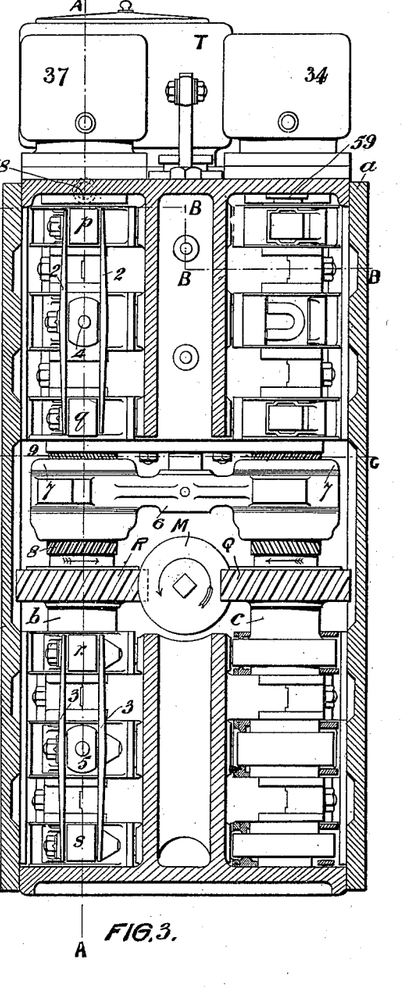
Fig. 3 is a sectional elevation through the valve-casing *a*.

The valve-casing *a* is situated between the high-pressure and the low-pressure cylinders and is full of oil, which is supplied from the reservoir T. Inside the casing *a* are two cam-shafts *b* and *c*, which are rotated by the horizontal shaft L by means of the skew-wheels M, Q, and R (see Fig. 3) at half the speed of the engine crank-shaft. The cam-shaft *b* carries at its upper part the fixed cams *h* and *l* and the moving cam *k* and at its lower part the moving cam *m* and the fixed cams *n* and *o*. The cams *h* and *k* are for operating the steam-valve at the upper end of the low-pressure cylinder, and the cam *l* is for operating the exhaust-valve at the top of the high-pressure cylinder. The cams *m* and *n* are for operating the steam-valves at the lower end of the low-pressure cylinder, and the cam *o* operates the lower exhaust-valve of the high-pressure cylinder.

Figure 4:
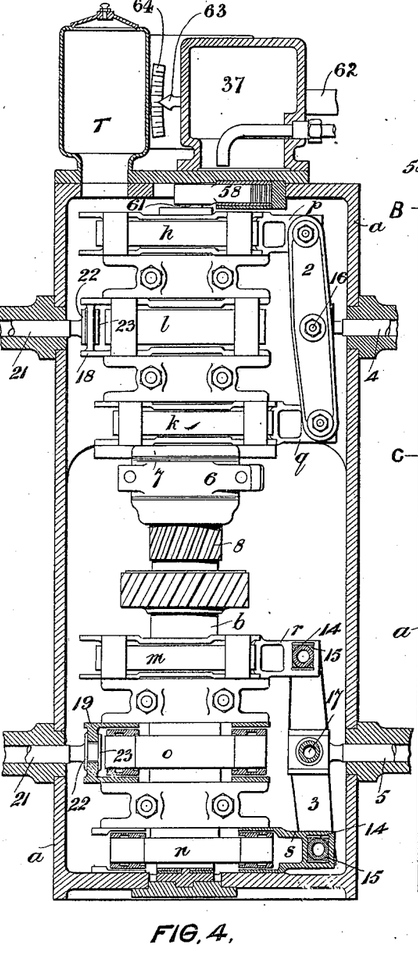
Fig. 4 is a section of the valve-casing *a*, the section being taken on the lines A A of Figs. 3, 5, 6, and 7.
Figure 13:
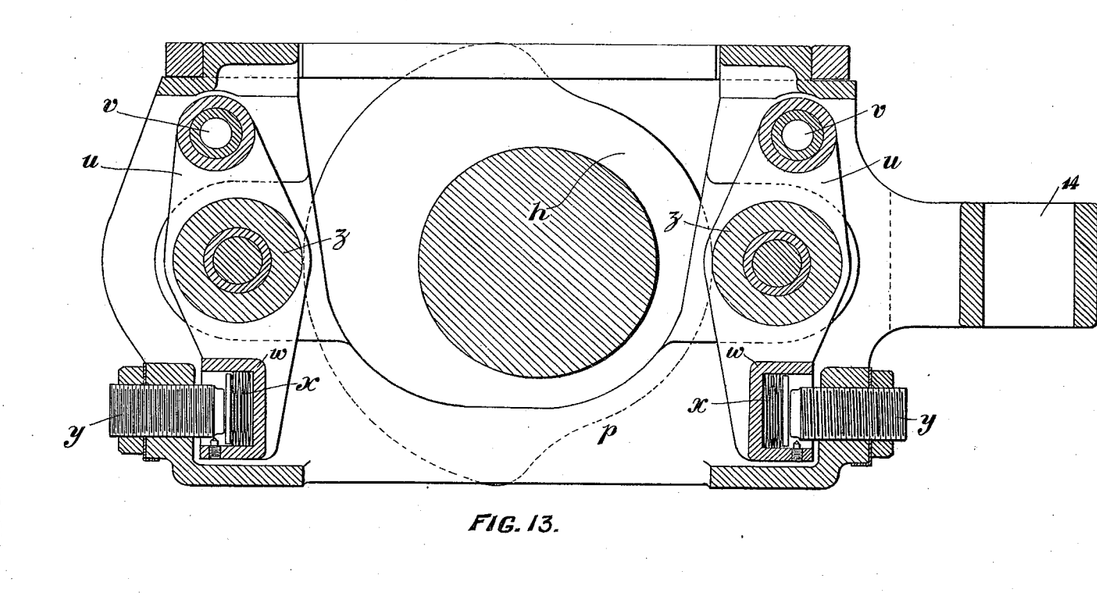
Fig. 13 is a bridle or slide, by means of which the steam-cams actuate the valves.

Each of these cams is of constant diameter—that is, any depression on the one side is counterbalanced by a corresponding projection on the other side. The steam-cams actuate the valves through the agency of slides or bridles $p$, $q$, $r$, and $s$, one of which is shown in plan in Fig. 13. Each of these bridles carries two buffer-levers $u$ $u$, each pivoted to the bridle at one end $v$ and having at its other end a small cylinder or casing $w$, provided with a number of disks or plates $x$, which are preferably slightly bent to give them some elasticity. Each lever carries a roller $z$, which bears against one or other side of the cam, as shown in Fig. 13. An adjusting-screw $y$ presses against the disks $x$ with any desired pressure, so as to press them into the cylinder $w$. The pressure which the rollers $z$ $z$ exert on the cam is thus controlled. As the valve-gear is intended to be immersed in oil, the disks act to produce oil cushioning by interposing resistance to the escape of the oil film between them. A slight elasticity is thus given to the rollers and small variations from constant diameter in the cam compensated for. By this means, although the rollers $z$ $z$ are very firmly secured within each bridle, a slight cushioning effect is produced which permits the cam to operate with great smoothness, notwithstanding a comparatively rapid reciprocating movement of the bridle. It should be noted that the cylinder or casing $w$ is intended merely to contain the disks and not to act as a dash-pot. Each of these bridles for actuating the steam-valves is provided at one end with a slot 14, (see Fig. 4,) in which works vertically a suitable block 15, pivoted to the end of the vertical levers 2 and 3. The fixed cam $h$ is thus connected by its bridle with the top end of the lever 2 and the moving cam $k$ with the bottom end of the same lever. Similarly the moving cam $m$ and the fixed cam $n$ are connected to the top and bottom ends, respectively, of the lever 3. Valve-spindles 4 and 5 are respectively pivoted at 16 and 17 to the levers 2 and 3 at points intermediate between the ends of these levers. These valve-spindles by their reciprocating movement open and close the steam-valves of the low-pressure cylinder in a manner which can be best understood by referring to Fig. 11, which illustrates the operation diagrammatically with reference to the valve-spindle 2, which operates the upper steam-valve of the low-pressure cylinder.

Figure 11:
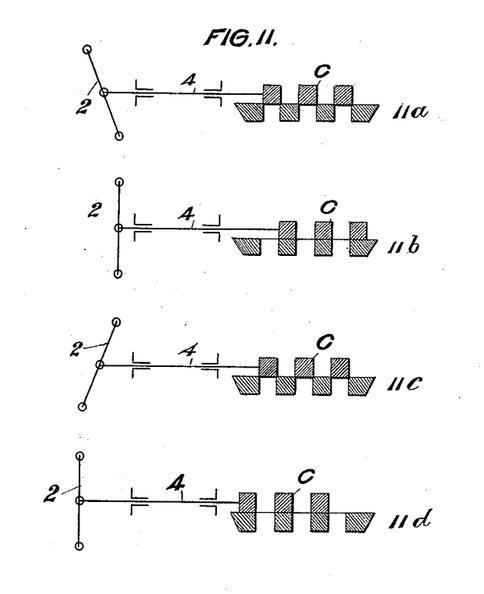
Fig. 11 is a diagrammatic view illustrating the opening and closing of the steam-valves.

Let $11^a$ be the initial position of the valve mechanism, the valve being closed. The fixed cam-bridle (which acts on the top of the lever) is here full in and the moving cam-bridle full out. The fixed cam-bridle now moves out, the lever turns about its lower end as a fulcrum, and the valve-spindle is moved longitudinally, opening the valve, as shown at $11^b$. The moving cam-bridle now moves in, the lever turns about its upper end as a fulcrum, and the valve is closed again, as shown at $11^c$. The fixed cam-bridle now moves in, and the lever turning about its lower end again opens the valve, as shown at $11^d$. Lastly, the outward movement of the moving cam-bridle returns the valve and mechanism to their original positions at $11^a$. The lower steam-valve of the low-pressure cylinder is actuated by the lever 3 and valve-spindle 5 in a similar manner. It will thus be seen that the fixed cams open the steam-valves and the moving cams close them. By altering the angular position of the moving cams on their shaft I can cut off steam at any point of the stroke I please, while the point of steam admission or the lead is unaltered. It will be seen that when the opening and closing cams are in opposition no steam will be admitted.

The shaft $c$ is provided with cams and other valve-gear of a nature precisely similar to that on the shaft $b$ and is used for controlling the steam-supply to the high-pressure cylinder of the engine.

Figure 8:
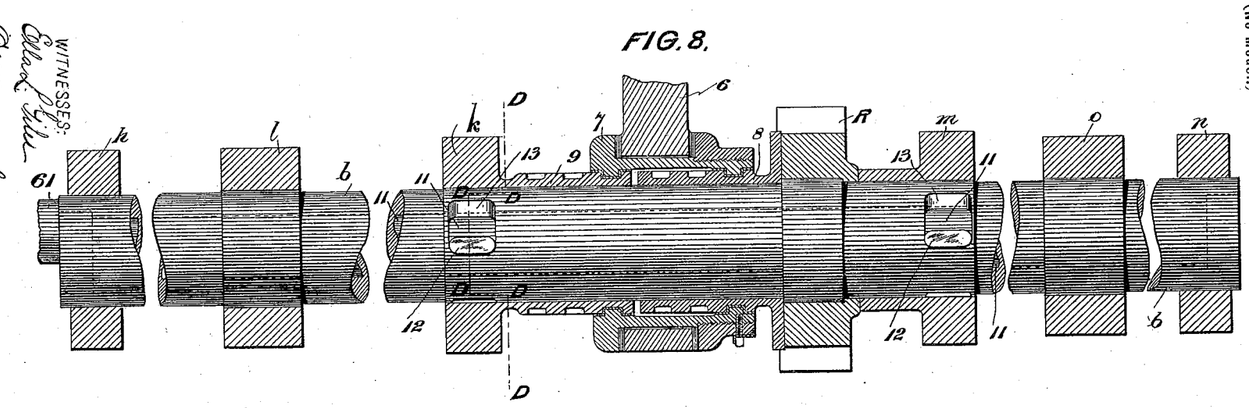
Fig. 8 shows one of the cam-shafts with the cams, screwed sleeves, sliding nut, cross-piece, and skew-wheel in section.
Figure 9:
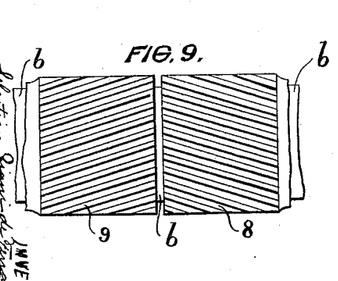
Fig. 9 shows the screwed sleeves for actuating the valve-closing cams.
Figure 10:
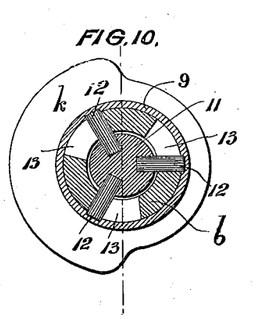
Fig. 10 is a section taken on the line D D of Fig. 8 and illustrates the method of rotating the valve-closing cams on the cam-shaft.

I shall now describe how the angular position of the moving cams on the cam-shafts is controlled. I provide a cross-piece 6, which is adapted to be moved up and down by a governor or combination of governors or by a relay controlled by a governor. This cross-piece carries a nut 7 at each end, the nuts inclosing the cam-shafts $b$ and $c$. Each nut is able to rotate in the end of the cross-piece and is screwed internally with two very quick threads, one right hand and the other left hand, which engage, respectively, with two similar threads cut on the outside of two sleeves 8 and 9, Figs. 3, 4, 7, 8, and 9. The sleeve 8 is rigidly attached to the cam-shaft, and therefore revolves with it. The other sleeve 9 is formed in one piece with the moving cam $k$. Therefore if the nut 7 be moved parallel to the axis of the shaft it will rotate a certain amount relatively to the shaft in one direction and a certain amount relatively to the moving cam $k$ in the other direction. The angular displacement of the cam $k$ relatively to the shaft will therefore equal the sum of these amounts. The shaft $b$ is made hollow and incloses an inner shaft 11, Figs. 8 and 10, which is keyed to the moving cams $k$ and $m$ by the keys 12, so that the two moving cams and the inner shaft rotate together. The keys 12 work in holes 13 in the shaft $b$, which allow the inner shaft to rotate through a certain angle relatively to the cam-shaft $b$. Thus any movement of the cross-piece 6, parallel to the axes of the shafts, causes the moving cams $k$ and $m$ to rotate relatively to the cam-shaft, and this will happen whether the cam-shaft be at rest or in motion. The shaft $c$, carrying the cams for controlling the steam-supply to the high-pressure cylinder, is provided with similar mechanism which acts in a similar manner.

Figure 12:
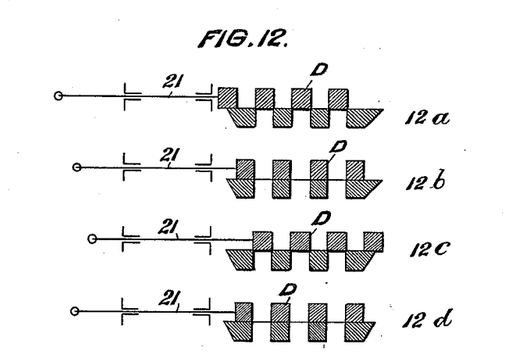
Fig. 12 similarly illustrates the opening and closing of the exhaust-valves.
Figure 14:
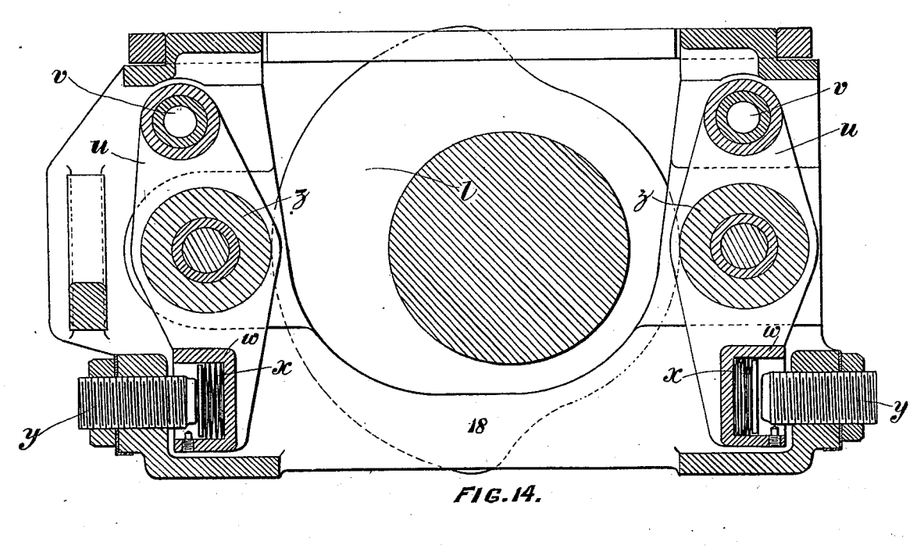
Fig. 14 is a bridle or slide, by means of which the exhaust-cams actuate the valves.

The exhaust-cams $l$ and $o$ on the shaft $b$ are inclosed by the bridles or slides 18 and 19, one of which is shown in plan in Fig. 14 drawn to a large scale. These bridles are very similar to the bridles of the steam-cams hereinbefore described, except that the end of each is not adapted to receive a sliding block, but is fitted to hold the end of one of the exhaust-valve rods 21 between two flanges 22 and 23. These valve-rods are so connected to the upper and lower exhaust-valves, respectively, of the high-pressure cylinder and open and close the valves in the following manner, which I shall describe with reference to Fig. 12: When the cam-bridle is full in, the valve-rod and valve are in the positions shown at 12ª, the valve being closed. The bridle now moves half-way out and the valve is opened, as shown at 12ᵇ. The bridle continues its outward motion, and when it is full out the valve is again closed, as shown at 12ᶜ. The bridle now moves inward half-way and the valve is opened again, as can be seen at 12ᵈ. Lastly, the bridle moves full in and the valve returns to its position shown at 12ª.

It will be seen that both the steam-valves and the exhaust-valves open twice and close twice for each cycle of movement. This allows of the rotation of the cam-shaft being only half that of the crank-shaft of the engine, thereby facilitating smooth working of the cams.

Figure 1:
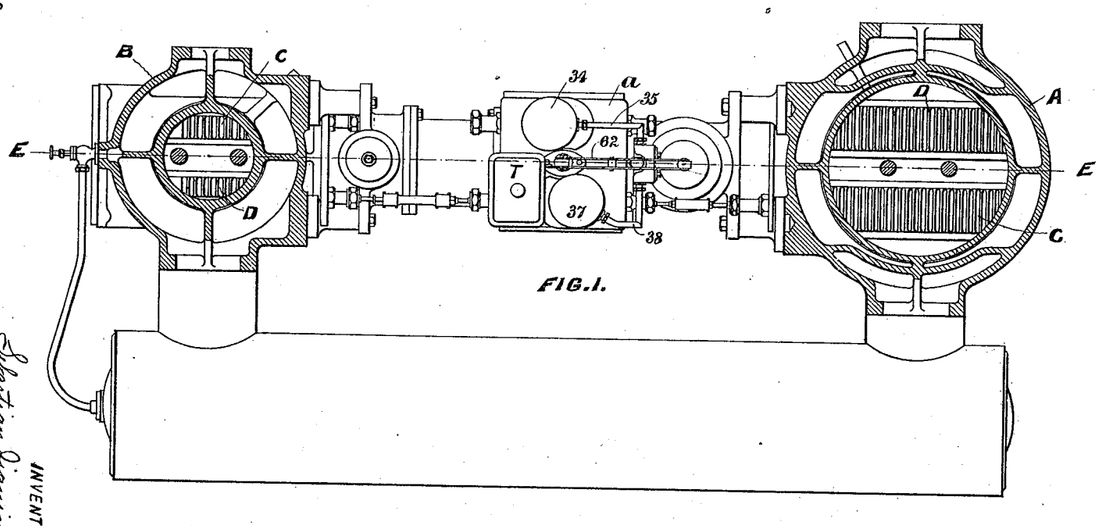
Figure 1 is a plan of the engine with the crank-shaft and other lower parts removed.
Figure 2:
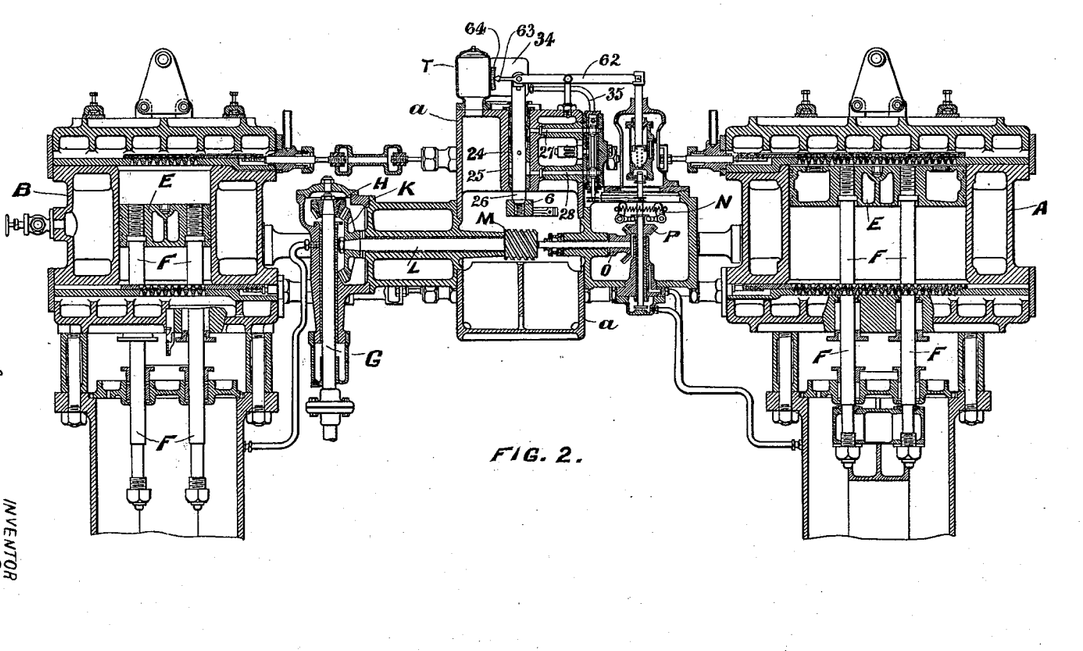
Fig. 2 is a sectional elevation of the same, the section being taken on the line E E of Fig. 1.
Figure 5:
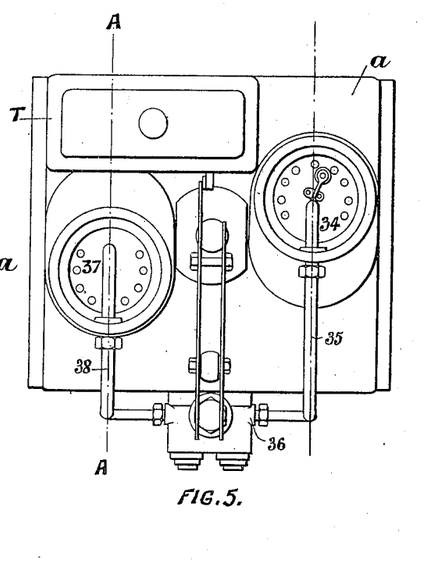
Fig. 5 is a plan of the valve-casing.
Figure 6:
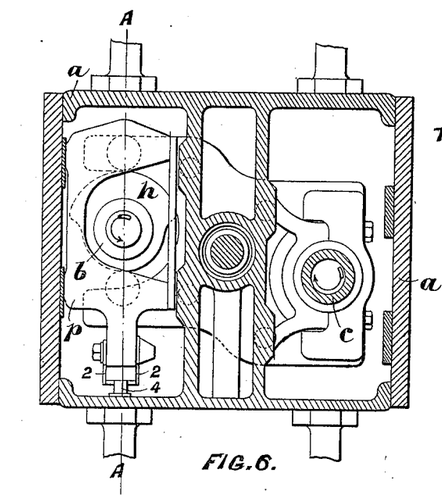
Fig. 6 is a sectional plan of the same, the section being taken on the line B B B B of Fig. 3.
Figure 7:
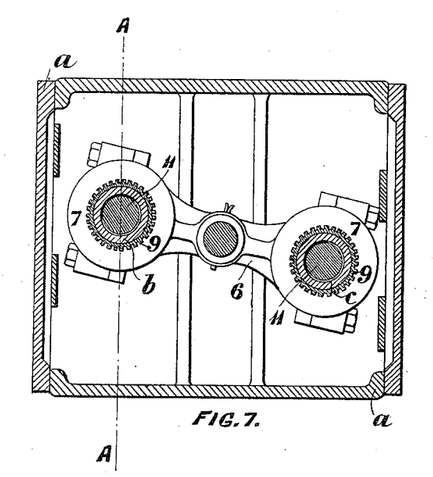
Fig. 7 is another sectional plan of the same, the section being taken on the line C C of Fig. 3.
Figure 15:
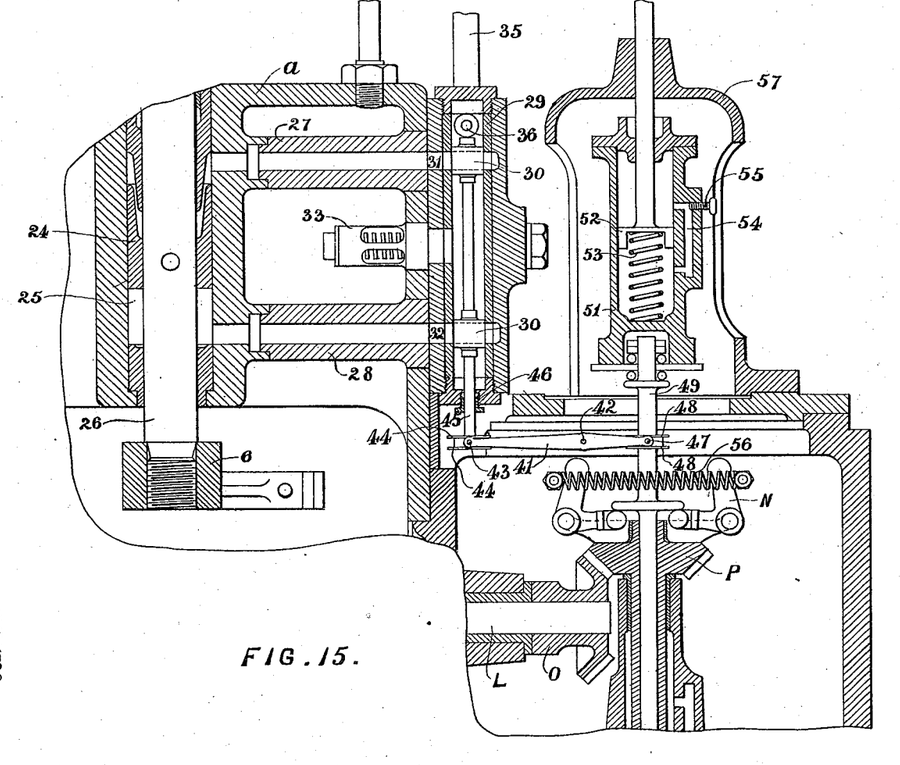
Fig. 15 is a section through the oil-relay cylinder, showing its connection with the governor.

The cross-piece 6, before referred to, may advantageously be operated by means of a piston 24, Figs. 2 and 15, working in an oil relay-cylinder 25 and connected to the cross-piece by the piston-rod 26. The oil-cylinder receives oil through two pipes 27 and 28, having ports 31 and 32 in the oil valve-cylinder 29. The ports 31 and 32 can be placed either in communication with the ends of this valve-cylinder or with the spring-controlled exhaust-valve 33 by means of a piston-valve 30. The top end of the cylinder communicates with the oil pressure-reservoir 34 by means of the tube 35, which enters the valve-cylinder at 36, Figs. 5 and 15. The lower end of the oil valve-cylinder communicates similarly with the oil pressure-reservoir 37 by means of the tube 38, which cannot be seen in Fig. 15, but is seen in Figs. 1 and 5. The piston-valve 30 is controlled by the governor N by means of the lever 41, pivoted at 42. This lever has at one end pins 43, which work between collars 44 on the piston-valve spindle 45, which passes through a stuffing-box 46 at the bottom of the valve-cylinder. The other end of the lever 41 is provided with pins 47, which work between collars 48 on the governor-spindle 49. The governor-spindle carries a dash-pot 51, containing a fixed piston 52. The portion of the dash-pot below the piston contains a spring 53, and this portion is joined to the part above the piston by the passage 54, which can be more or less closed by the regulating-screw 55. The spring 53 may be dispensed with and a spring 56 applied to the governor instead, or both springs may be used. The dash-pot is preferably inclosed in a casing 57.

An increase or decrease in the speed of the engine causes a rise or fall, respectively, in the governor-spindle 49, owing to the action of the governor. This causes a fall or rise in the piston-valve spindle 45 and admits oil to one or other of the ports 31 or 32, while the other port is put in communication with the exhaust-valve 33 in a manner that is well understood. The oil-piston 24, having unequal pressures on top and bottom, therefore moves down or up and actuates the cross-piece 6, which alters the angular position of the steam-closing cams on the cam-shafts, as hereinbefore described. I connect the piston-rod 26 with a pivoted lever 62, carrying a pointer 63, which traverses a scale 64. This pointer indicates on the scale the exact cut-off at which the valves are operating.

The oil pressure-reservoirs receive oil under a constant pressure from pumps 58 and 59, actuated by eccentric pins 61, on the end of the cam-shafts $b$ and $c$. The spring in the discharge-valve 33 limits the rate of motion of the oil-piston 24 when very great variations in the load on the engine suddenly occur.

By my invention, as hereinbefore described, I perform all the steam-exhaust and governing actions by means of cams, levers, screws, and skew-gear, together with hydraulic relay, all inclosed within one casing and all the cams and moving parts continually immersed in oil. By this arrangement I produce a very sensitive valve-gear which accurately determines the steam admission, steam cut-off, and the variation of steam cut-off in a smooth working apparatus.

Having thus described my invention, what I claim as new, and desire to secure by Letters Patent, is—

1. In valve operating and governing gear, in combination a cam-shaft, fixed and moving steam-cams carried by said shaft, means for rotating the moving cams relatively to the shaft, bridles reciprocated by the said steam-cams, slots in the ends of the bridles, blocks sliding in the said slots, levers pivoted to the blocks and oscillated by the bridles, valve-spindles reciprocated by the levers and grid-valves, actuated by the valve-spindles, substantially as and for the purpose described.

2. In valve operating and governing gear for steam-engines, in combination, a valve-casing, a cam-shaft adapted to rotate in oil in said casing, fixed and moving steam-cams of constant diameter measured through the axis of rotation carried by the said shaft, a governor, means for rotating the moving cams relatively to the shaft by means of the governor, bridles reciprocated by the said steam-cams, slots in the end of the bridles, blocks sliding in the said slots levers pivoted to the blocks and oscillated by the bridles, valve-spindles pivoted to and reciprocated by the levers, and grid-valves actuated by the valve-spindles and adapted to be opened by the fixed cams and closed by the moving cams, substantially as and for the purpose described.

3. In valve operating and governing gear for steam-engines in combination, cam-shafts $b$ and $c$, inner shafts 11 contained by the cam-shafts, cams $k$ and $m$ keyed to the said inner shafts, a cross-piece such as 6, a nut rotatably supported at each end of the cross-piece, quick right and left hand threads in the nuts, two sleeves with right and left hand external threads respectively adapted to engage with each nut, one sleeve being fixed on each of the aforesaid cam-shafts and the other being rigid with one of the aforesaid cams $k$ or $m$, substantially as and for the purpose described.

4. In valve operating and governing gear for steam-engines in combination, cam-shafts such as $b$ and $c$ two cams $h$ and $n$ fixed to each shaft, an inner shaft such as 11 inclosed in each cam-shaft, two cams such as $k$ and $m$ keyed to each inner shaft, a governor, a cross-piece such as 6 controlled by the governor, a nut supported but free to rotate at each end of the cross-piece, quick right and left hand threads in each nut, two sleeves with right and left hand external threads respectively adapted to engage with each nut, one sleeve being fixed on one of the said cam-shafts and the other being made in one piece with one of the said cams $k$ or $m$ substantially as and for the purpose described.

5. In valve-operating gear for steam-engines, in combination a cam-shaft adapted to rotate at half the speed of the engine crank-shaft, steam-opening, steam-closing and exhaust cams carried by said cam-shaft, and steam and exhaust valves operated by said cams and adapted to open and close twice in a single cycle of their movements, substantially as and for the purpose described.

6. In valve operating and governing gears for steam-engines, in combination, steam-valves at both ends of the cylinder, exhaust-valves at both ends of the cylinder, a cam-shaft, two steam-opening cams fixed on the said shaft and means whereby these cams open the steam-valves, a governor, two steam-closing cams rotatably carried by the aforesaid shaft and means whereby these cams close the steam-valves under the control of the governor, exhaust-cams fixed on the aforesaid shafts and means whereby these exhaust-cams open and close the exhaust-valve, substantially as described.

7. In valve operating and governing gear for steam-engines, in combination, steam grid-valves such as C at both ends of the cylinder, exhaust grid-valves such as D at both ends of the cylinder and alongside of the said steam-valves, a cam-shaft $b$, means to rotate the said cam-shaft at half the speed of the engine crank-shaft, two steam-opening cams $h$ and $n$ fixed on the said cam-shaft and means whereby these cams open the steam-valves, two steam-closing cams $k$ and $m$ rotatably carried by the aforesaid cam-shaft and means whereby these cams close the steam-valves, two exhaust-cams $l$ and $o$ each fixed on the aforesaid cam-shaft between a steam-opening and a steam-closing cam and means whereby these exhaust-cams open and close the exhaust-valves, substantially as described.

8. In valve-operating gear, the combination, with reciprocating means for operating the valves, of an oil-cushioning device comprising a number of plates with oil films between them for the purpose of taking up the blows due to the inertia of the reciprocating parts, substantially as described.

9. In valve-operating gear, in combination, a cam of constant diameter, a bridle such as $p$, buffer-levers pivoted to the bridle, rollers carried one by each of said levers and adapted to press on opposite sides of the cam, a casing carried by each lever, disks, such as $x$ retained by said casings and immersed in oil, and screws for regulating the pressure on the disks, substantially as and for the purpose described.

10. In combination, two steam-cylinders, a valve-gear casing situated between said cylinders and adapted to contain oil, two cam-shafts contained in said valve-casing, two sets of cams on each cam-shaft, each set comprising a steam-opening and a steam-closing cam for one cylinder and an exhaust-cam for the other cylinder, the steam-closing cams being adapted to be rotated relatively to the cam-shafts, substantially as and for the purpose described.

11. In combination, two steam-cylinders, a valve-gear casing situated between said cylinders and adapted to contain oil, two cam-shafts contained in said casing, two sets of cams on each cam-shaft, each set comprising a steam-opening and a steam-closing cam for one cylinder and an exhaust-cam for the other cylinder, the operation of both sets of valves being effected by the cams giving a direct push and pull between the cylinders, substantially as described.

In witness whereof I have hereunto set my hand in presence of two witnesses.

SEBASTIAN ZIANI DE FERRANTI.

Witnesses:
    ALBERT G. PARKER,
    F. J. BIGNELL.